United States Patent
Yu et al.

(10) Patent No.: US 11,920,016 B2
(45) Date of Patent: Mar. 5, 2024

(54) METHODS OF FORMING POLYOL PREMIXES AND FOAMABLE COMPOSITIONS AND FOAMS FORMED THEREFROM

(71) Applicant: HONEYWELL INTERNATIONAL INC., Charlotte, NC (US)

(72) Inventors: Bin Yu, Charlotte, NC (US); Mary C. Bogdan, Charlotte, NC (US); David John Williams, Charlotte, NC (US); Yiu Keung Ling, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/523,799

(22) Filed: Nov. 10, 2021

(65) Prior Publication Data

US 2022/0135757 A1    May 5, 2022

Related U.S. Application Data

(63) Continuation of application No. 16/135,269, filed on Sep. 19, 2018, now abandoned.

(60) Provisional application No. 62/563,393, filed on Sep. 26, 2017, provisional application No. 62/560,596, filed on Sep. 19, 2017.

(51) Int. Cl.
    *C08J 9/02* (2006.01)
    *C08J 9/14* (2006.01)

(52) U.S. Cl.
    CPC ............... *C08J 9/02* (2013.01); *C08J 9/142* (2013.01); *C08J 9/145* (2013.01); *C08J 9/146* (2013.01); *C08J 2201/022* (2013.01); *C08J 2203/12* (2013.01); *C08J 2203/164* (2013.01); *C08J 2203/182* (2013.01); *C08J 2375/06* (2013.01)

(58) Field of Classification Search
    CPC ..... C08J 9/02; C08J 9/142; C08J 9/143; C08J 9/145; C08J 9/146; C08J 9/149; C08J 2201/022; C08J 2203/12; C08J 2203/164; C08J 2203/182; C08J 2375/06; C08G 18/42
    See application file for complete search history.

(56) References Cited

U.S. PATENT DOCUMENTS

| | | | | |
|---|---|---|---|---|
| 9,000,061 | B2 * | 4/2015 | Ling | C08G 18/1808 521/137 |
| 10,344,136 | B2 * | 7/2019 | Bogdan | C08G 18/7671 |
| 2011/0152392 | A1 * | 6/2011 | Van Der Puy | C08G 18/1875 521/88 |
| 2012/0104307 | A1 * | 5/2012 | Bogdan | C08G 18/4208 252/62 |

* cited by examiner

*Primary Examiner* — John M Cooney
(74) *Attorney, Agent, or Firm* — Colleen D. Szuch

(57) ABSTRACT

This invention relates to thermoset, thermal insulating panel, pour-in-place and pour-in-place foams having desirable and unexpectedly low thermal conductivity, and to compositions, method and systems which use and/or are used to make such foams comprising: (a) providing thermosetting foam forming component and a blowing agent for forming predominantly closed cells in the foam, wherein the blowing agent comprises: (i) cis-1,1,1,4,4,4-hexafluoro-2-butene (HFO-1336mzzm(Z)) and cyclopentane, with the HFO-1336mzzm(Z) and cyclopentane in the blowing agent together comprising at least about 50% by weight of the total of all components in the blowing agent and (ii) the weight ratio of HFO-1336mzzm(Z) to cyclopentane in the blowing agent is from about 45:55 to less than 68:32 and (b) forming foam from said provided foamable composition.

20 Claims, No Drawings

METHODS OF FORMING POLYOL PREMIXES AND FOAMABLE COMPOSITIONS AND FOAMS FORMED THEREFROM

REFERENCE TO RELATED APPLICATIONS

The present application is a continuation of U.S. application Ser. No. 16/135,269 filed Sep. 19, 2018 which is related to and claims the priority benefit of U.S. Provisional Application 62/560,596, filed Sep. 19, 2017 and of U.S. Provisional Application 62/563,393, filed Sep. 26, 2017, each of which is incorporated herein by reference.

FIELD OF THE INVENTION

This invention relates to methods of forming polyol premixes, to methods of forming foamable compositions and foams, and to foamable compositions and foams formed from these.

BACKGROUND OF THE INVENTION

Polyurethane (PU) and polyisocyanurate (PIR) foams in general have numerous and widely varying applications and can be formed from a wide variety of materials appropriate for this purpose. For example, one such application is to provide thermal insulation.

Polyurethane foams are produced by reacting a polyisocyanate with one or more polyols in the presence of one or more blowing agents, one or more catalysts, one or more surfactants and optionally other ingredients. In the case of polyisocyanurate foam, the foam is formed by the reaction of polyisocyanate with itself to form a cyclic trimer structure. In practice, foams commonly described as polyisocyanurate contain both polyurethane and polyisocyanurate structures and foams described as polyurethane often incorporate some polyisocyanurate structures. Thus, the present application relates to polyurethane foams, to polyisocyanurate foams and to mixtures thereof. For the purposes of convenience, the designation "PU/PIR" is intended to designate a material that is suitable for forming a PU foam, a PIR foam and any foam that combines PU and PIR foam structures In the vast majority of PU/PIR foam manufacturing processes, the cellular structure is imparted by incorporating a chemical blowing agent and/or a physical blowing agent into the foamable formulation. A chemical blowing agent reacts under the conditions of the curing reaction to generate a gas. One of the most commonly used chemical blowing agent is water, which reacts with isocyanate groups to produce urea linkages which extend the polymer chain, and as a by-product of that reaction carbon dioxide gas is generated, which in turn acts as a blowing agent. Physical blowing agents are low-boiling liquids which volatilize under the curing conditions to form the blowing gas. Various types of hydrocarbons, fluorocarbons, hydrofluorocarbons and other halogenated compounds have been used as physical blowing agents.

As is known to those skilled in the art, it is desirable and convenient in many applications to provide the components for forming PU/PIR foams in pre-blended formulations. Typically, the foam formulation is pre-blended into two separate mixes or blends. The polyisocyanate and optional isocyanate compatible raw materials comprise the first mix or blend, commonly referred to as the "A" side or blend. A second and separate blend, generally called the "B" side, is also formed that includes a polyol or mixture of polyols reactive with the polyisocyante in the A side. It is frequently desirable to include in the B-side one or more of surfactant, catalyst, blowing agent, and other isocyanate reactive and non-reactive components. In practice, the A-side and the B-side components can be and are prepared and packaged into separate containers, usually drums or the like, and then stored and/or transported to the location of intended use. At the time for forming the foam, the B side drum or other container is opened or tapped, and then the contents are removed and combined with the A-side under conditions known in the art that are suitable to initiate the foaming reaction. The B-side is sometimes referred to in the industry as a polyol premix since it is blended at a point in time prior to the intended time of use.

It is common and likely that at both the time of forming the polyol premix and at the time the drum or container is opened or tapped, agitation of the polyol and the blowing agent occurs, and/or the temperature at which the drum or container is opened or tapped is relatively elevated. Applicants have come to appreciate that one difficulty that can arise with combinations of some polyols and with certain blowing agents is the problem of frothing. This problem can be manifest in one or more different ways. For example, this problem can result in an unwanted increase in the time required to create a homogeneous and stable pre-mix that can be packaged and stored for use later. This problem can also be manifest at the time the stored polyol premix is opened or tapped. In such cases, the drum or container in which the polyol has been stored will undergo a level of agitation that can develop unwanted frothing and/or the temperature at which the drum or container is opened or tapped is relatively elevated, which in turn can result in a defective foam being formed or will add a highly disadvantageous delay before use in order to allow the frothing to cease. Another disadvantage of such frothing that may occur is that the frothing can cause the polyol premix to escape from the container and into the environment, which can potentially constitute a costly and potentially dangerous chemical spill in the area of use.

As used herein, the term frothing refers to the formation of a layer or region of the polyol premix, generally on the surface, in which bubbles are formed by the blowing agent escaping from the liquid polyol of the polyol premix. This frothing is generally a dynamic phenomenon that tends in most cases to dissipate and discontinue over time. As mentioned above, frothing can occur in the process of forming the polyol premix and may also occur as part of the process of bringing the polyol premix together with the A-side at or just prior to the time of use. Frothing in both of these contexts is generally considered a disadvantage because it requires the formulator and/or the user to include de-frothing time in the process. Furthermore, frothing can be a disadvantage because it can make it harder to obtain the proper flow of the dispensed polyol premix and can degrade the foam quality if it is present when the A-side and the B-side are brought together.

The potential difficulty associated with frothing has been recognized, for example, in U.S. Pat. No. 9,228,071. The '071 patent discloses the use of several blowing agents contained in a pre-blended B-side cylinder. This patent mentions in Example 5 the degree of frothing associated the several blowing agents tested. Although there is no disclosure of how frothing is tested or measured, this patent indicates that the "degree of frothing" for two blowing agents comprising mostly (on a weight basis) HFO-1233zd when combined with a particular combination of polyols is "none." The other blowing agents tested were indicated as having a degree of frothing that was either "high" or "very high" with that same combination of polyols.

As explained in detail below, applicants have come to appreciate that, notwithstanding the disclosure in U.S. Pat. No. 9,228,071, the frothing problem associated with the use of blowing agents comprising high concentrations of HFCO-1233zd can be quite severe, especially when the polyol contains certain types of polyols, to the point of making use of such blowing agent, especially with certain types of polyols, unfavored and/or unacceptable.

SUMMARY

Applicants have found that, in the absence of the present invention, a frothing problem exists in connection with the formation of and/or the use of polyol premixes containing blowing agents which use transHFCO-1233zd and those which use cis-1,1,1,4,4,4-hexafluoro-2-butene (HFO-1336mzzm(Z) or cis-1336mzzm), and that this frothing problem if left unsolved could result in a decision against the economic viability of such polyol premixes for many applications.

The present invention provides polyol premixes that have an unexpectedly and significantly improved resistance to frothing and in preferred embodiments comprise:
(a) one or more polyols, preferably polyester polyols;
(b) a blowing agent comprising at least about 50% by weight of transHFCO-1233zd; and
(c) a defrothing component comprising either (1) a physical co-blowing agent having de-frothing properties selected from the group consisting of cis-1,1,1,4,4,4-hexafluoro-2-butene (HFO-1336mzzm(Z) or cis-1336mzzm), methylal, methyl formate, glycerine, trans dichloroethylene (tDCE) and mixtures of two or more of these or (2) a surfactant having defrothing properties, preferably a surfactant in combination with glycol ether or (3) a combination of (1) and (2),
wherein the amount of said de-frothing component is effective to reduce the de-frothing time of the polyol premix, preferably by at least about 30%, more preferably at least about 50%, and even more preferably at least about 80% compared to the de-frothing time for the same polyol premix but without the de-frothing component.

The present invention provides polyol premixes that have significantly improved resistance to frothing and in preferred embodiments comprise:
(a) one or more polyester polyols;
(b) a blowing agent comprising at least about 50% by weight of transHFCO-1233zd; and
(c) a defrothing component comprising, or consisting essentially of, or consisting of cis-1,1,1,4,4,4-hexafluoro-2-butene (HFO-1336mzzm(Z) or cis-1336mzzm),
wherein the amount of said de-frothing component is effective to reduce the de-frothing time of the polyol premix by at least about 30%.

As used herein, reference to a reduction in frothing by in an amount by percentage refers to the relative percentage in the de-frothing time for the same polyol premix but without the de-frothing component.

The term "Blowing Agent 1" as used herein refers to each blowing agent comprising at least about 50% by weight of transHFCO-1233zd and a defrothing component comprising, or consisting essentially of, or consisting of cis-1,1,1, 4,4,4-hexafluoro-2-butene (HFO-1336mzzm(Z) or cis-1336mzzm).

The present invention provides polyol premixes that have significantly improved resistance to frothing and in preferred embodiments comprise:
(a) one or more polyester polyols; and
(b) Blowing Agent 1, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols; and
(b) Blowing Agent 1, wherein the amount of said de-frothing component is effective to reduce the de-frothing time of the polyol premix by at least about 80%.

The present invention provides polyol premixes that have significantly improved resistance to frothing and in preferred embodiments comprise:
(a) one or more polyester polyols;
(b) a blowing agent comprising at least about 50% by weight of transHFCO-1233zd;
and (c) a defrothing component comprising, or consisting essentially of, or consisting of methylal, wherein the amount of said de-frothing component is effective to reduce the de-frothing time of the polyol premix by at least about 30%.

The term "Blowing Agent 2" as used herein refers to each blowing agent comprising at least about 50% by weight of transHFCO-1233zd and a defrothing component comprising, consisting essentially of, or consisting of methylal.

The present invention provides polyol premixes that have significantly improved resistance to frothing and in preferred embodiments comprise:
(a) one or more polyester polyols; and
(b) Blowing Agent 2, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols;
(b) a blowing agent comprising at least about 50% by weight of transHFCO-1233zd;
and (c) a defrothing component comprising, or consisting essentially of, or consisting of methyl formate, wherein the amount of said de-frothing component is effective to reduce the de-frothing time of the polyol premix by at least about 30%.

The term "Blowing Agent 3" as used herein refers to each blowing agent comprising at least about 50% by weight of transHFCO-1233zd and a defrothing component comprising, consisting essentially of, or consisting of methyl formate.

The present invention provides polyol premixes that have significantly improved resistance to frothing and in preferred embodiments comprise:
(a) one or more polyester polyols; and
(b) Blowing Agent 3, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols; and
(b) Blowing Agent 3, wherein the amount of said de-frothing component is effective to reduce the de-frothing time of the polyol premix by at least about 80%.

The present invention provides polyol premixes that have significantly improved resistance to frothing and in preferred embodiments comprise:
(a) one or more polyester polyols;
(b) a blowing agent comprising at least about 50% by weight of transHFCO-1233zd;
and (c) a defrothing component comprising, or consisting essentially of, or consisting of glycerine, wherein the amount of said de-frothing component is effective to reduce the de-frothing time of the polyol premix by at least about 30%.

The term "Blowing Agent 4" as used herein refers to each blowing agent comprising at least about 50% by weight of transHFCO-1233zd and a defrothing component comprising, consisting essentially of, or consisting of glycerine.

The present invention provides polyol premixes that have significantly improved resistance to frothing and in preferred embodiments comprise:
(a) one or more polyester polyols; and
(b) Blowing Agent 4, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols; and
(b) Blowing Agent 4, wherein the amount of said de-frothing component is effective to reduce the de-frothing time of the polyol premix by at least about 80%.

The present invention provides polyol premixes that have significantly improved resistance to frothing and in preferred embodiments comprise:
(a) one or more polyester polyols;
(b) a blowing agent comprising at least about 50% by weight of transHFCO-1233zd;
and (c) a defrothing component comprising, or consisting essentially of, or consisting of glycerine, wherein the amount of said de-frothing component is effective to reduce the de-frothing time of the polyol premix by at least about 30%.

The term "Blowing Agent 4" as used herein refers to each blowing agent comprising at least about 50% by weight of transHFCO-1233zd and a defrothing component comprising, consisting essentially of, or consisting of glycerine.

The present invention provides polyol premixes that have significantly improved resistance to frothing and in preferred embodiments comprise:
(a) one or more polyester polyols; and
(b) Blowing Agent 4, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols; and
(b) Blowing Agent 4, wherein the amount of said de-frothing component is effective to reduce the de-frothing time of the polyol premix by at least about 80%.

The present invention provides polyol premixes that have significantly improved resistance to frothing and in preferred embodiments comprise:
(a) one or more polyester polyols;
(b) a blowing agent comprising at least about 50% by weight of transHFCO-1233zd;
and (c) a defrothing component comprising, or consisting essentially of, or consisting of trans dichloroethylene (tDCE), wherein the amount of said de-frothing component is effective to reduce the de-frothing time of the polyol premix by at least about 30%.

The term "Blowing Agent 5" as used herein refers to each blowing agent comprising at least about 50% by weight of transHFCO-1233zd and a defrothing component comprising, consisting essentially of, or consisting of trans dichloroethylene (tDCE).

The present invention provides polyol premixes that have significantly improved resistance to frothing and in preferred embodiments comprise:
(a) one or more polyester polyols; and
(b) Blowing Agent 5, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols; and
(b) Blowing Agent 5, wherein the amount of said de-frothing component is effective to reduce the de-frothing time of the polyol premix by at least about 80%.

The term "Blowing Agent 6" as used herein refers to each blowing agent comprising at least about 20% by weight of cis-1,1,1,4,4,4-hexafluoro-2-butene (HFO-1336mzzm(Z) or cis-1336mzzm and a defrothing component comprising, or consisting essentially of, or consisting of transHFCO-1233zd.

The present invention provides polyol premixes that have significantly improved resistance to frothing and in preferred embodiments comprise:
(a) one or more polyester polyols; and
(b) Blowing Agent 6, wherein the amount of said de-frothing component is effective to reduce the de-frothing time of the polyol premix by at least about 50%.

The present invention provides polyol premixes that have significantly improved resistance to frothing and in preferred embodiments comprise:
(a) one or more polyester polyols; and
(b) Blowing Agent 6, wherein the amount of said de-frothing component is effective to reduce the de-frothing time of the polyol premix by at least about 80%.

The present invention provides polyol premixes that have an unexpectedly and significantly improved resistance to frothing and in preferred embodiments comprise:
(a) one or more polyols, preferably polyester polyols;
(b) a blowing agent comprising at least about 50% by weight of transHFCO-1233zd; and
(c) a surfactant having defrothing properties, preferably a surfactant in combination with glycol ether,
wherein the amount of said surfactant is effective to reduce the de-frothing time of the polyol premix, preferably by at least about 30%, more preferably at least about 50%, and even more preferably at least about 80% compared to the de-frothing time for the same polyol premix but without the de-frothing component.

The de-frothing time as used herein means the time to de-froth a combination of polyol(s) and blowing agent as measured according to the examples hereof.

In preferred embodiments, the present invention provides polyol premixes that have an unexpectedly and significantly improved resistance to frothing and comprise:
(a) one or more polyols, preferably polyester polyols;
(b) a blowing agent comprising at least about 50% by weight of transHFCO-1233zd; and
(c) a defrothing component comprising a physical co-blowing agent having de-frothing properties selected from the group consisting of cis-1,1,1,4,4,4-hexafluoro-2-butene (HFO-1336mzzm(Z) or cis-1336mzzm), methylal, methyl formate, glycerine, trans dichloroethylene (tDCE) and mixtures of two or more of these and optionally a surfactant having defrothing properties, preferably a silicone surfactant in combination with glycol ether, wherein the amount of said de-frothing component is effective to provide the polyol premix with a de-frothing time for the polyol premix of not greater than about 30 minutes, more preferably of not greater than about 20 minutes, even more preferably not greater than about 15 minutes, and most preferably of not greater than 10 minutes, wherein said de-frothing time is measured as described in the Examples hererof.

The de-frothing time as used herein means the time to de-froth a combination of polyol(s) and blowing agent as measured according to the examples hereof.

The present invention provides polyol premixes that have significantly improved resistance to frothing and in preferred embodiments comprise:
(a) one or more polyester polyols; and
(b) Blowing Agent 1, wherein the amount of said de-frothing component is effective to provide the polyol premix with a de-frothing time for the polyol premix of not greater than about 40 minutes.

As used herein, de-frothing time refers to the measurement as described in the Examples hererof.

The present invention provides polyol premixes that have significantly improved resistance to frothing and in preferred embodiments comprise:
(a) one or more polyester polyols; and
(b) Blowing Agent 1, wherein the amount of said de-frothing component is effective to provide the polyol premix with a de-frothing time for the polyol premix of not greater than about 30 minutes.

The present invention provides polyol premixes that have significantly improved resistance to frothing and in preferred embodiments comprise:
(a) one or more polyester polyols; and
(b) Blowing Agent 1, wherein the amount of said de-frothing component is effective to provide the polyol premix with a de-frothing time for the polyol premix of not greater than about 20 minutes.

The present invention provides polyol premixes that have significantly improved resistance to frothing and in preferred embodiments comprise:
(a) one or more polyester polyols; and
(b) Blowing Agent 2, wherein the amount of said de-frothing component is effective to provide the polyol premix with a de-frothing time for the polyol premix of not greater than about 40 minutes.

The present invention provides polyol premixes that have significantly improved resistance to frothing and in preferred embodiments comprise:
(a) one or more polyester polyols; and
(b) Blowing Agent 2, wherein the amount of said de-frothing component is effective to provide the polyol premix with a de-frothing time for the polyol premix of not greater than about 30 minutes.

The present invention provides polyol premixes that have significantly improved resistance to frothing and in preferred embodiments comprise:
(a) one or more polyester polyols; and
(b) Blowing Agent 2, wherein the amount of said de-frothing component is effective to provide the polyol premix with a de-frothing time for the polyol premix of not greater than about 20 minutes.

The present invention provides polyol premixes that have significantly improved resistance to frothing and in preferred embodiments comprise:
(a) one or more polyester polyols; and
(b) Blowing Agent 3, wherein the amount of said de-frothing component is effective to provide the polyol premix with a de-frothing time for the polyol premix of not greater than about 40 minutes.

The present invention provides polyol premixes that have significantly improved resistance to frothing and in preferred embodiments comprise:
(a) one or more polyester polyols; and
(b) Blowing Agent 3, wherein the amount of said de-frothing component is effective to provide the polyol premix with a de-frothing time for the polyol premix of not greater than about 30 minutes.

The present invention provides polyol premixes that have significantly improved resistance to frothing and in preferred embodiments comprise:
(a) one or more polyester polyols; and
(b) Blowing Agent 3, wherein the amount of said de-frothing component is effective to provide the polyol premix with a de-frothing time for the polyol premix of not greater than about 20 minutes.

The present invention provides polyol premixes that have significantly improved resistance to frothing and in preferred embodiments comprise:
(a) one or more polyester polyols; and
(b) Blowing Agent 4, wherein the amount of said de-frothing component is effective to provide the polyol premix with a de-frothing time for the polyol premix of not greater than about 40 minutes.

The present invention provides polyol premixes that have significantly improved resistance to frothing and in preferred embodiments comprise:
(a) one or more polyester polyols; and
(b) Blowing Agent 4, wherein the amount of said de-frothing component is effective to provide the polyol premix with a de-frothing time for the polyol premix of not greater than about 30 minutes.

The present invention provides polyol premixes that have significantly improved resistance to frothing and in preferred embodiments comprise:
(a) one or more polyester polyols; and
(b) Blowing Agent 4, wherein the amount of said de-frothing component is effective to provide the polyol premix with a de-frothing time for the polyol premix of not greater than about 20 minutes.

The present invention provides polyol premixes that have significantly improved resistance to frothing and in preferred embodiments comprise:
(a) one or more polyester polyols; and
(b) Blowing Agent 5, wherein the amount of said de-frothing component is effective to provide the polyol premix with a de-frothing time for the polyol premix of not greater than about 40 minutes.

The present invention provides polyol premixes that have significantly improved resistance to frothing and in preferred embodiments comprise:
(a) one or more polyester polyols; and
(b) Blowing Agent 5, wherein the amount of said de-frothing component is
effective to provide the polyol premix with a de-frothing time for the polyol premix of not greater than about 30 minutes.

The present invention provides polyol premixes that have significantly improved resistance to frothing and in preferred embodiments comprise:
(a) one or more polyester polyols; and
(b) Blowing Agent 5, wherein the amount of said de-frothing component is effective to provide the polyol premix with a de-frothing time for the polyol premix of not greater than about 20 minutes.

The present invention provides polyol premixes that have significantly improved resistance to frothing and in preferred embodiments comprise:
(a) one or more polyester polyols; and
(b) Blowing Agent 6, wherein the amount of said de-frothing component is effective to provide the polyol premix with a de-frothing time for the polyol premix of not greater than about 40 minutes.

The present invention provides polyol premixes that have significantly improved resistance to frothing and in preferred embodiments comprise:
(a) one or more polyester polyols; and
(b) Blowing Agent 6, wherein the amount of said de-frothing component is effective to provide the polyol premix with a de-frothing time for the polyol premix of not greater than about 30 minutes.

The present invention provides polyol premixes that have significantly improved resistance to frothing and in preferred embodiments comprise:
(a) one or more polyester polyols; and
(b) Blowing Agent 6, wherein the amount of said de-frothing component is effective to provide the polyol premix with a de-frothing time for the polyol premix of not greater than about 20 minutes.

In preferred embodiments, the present invention provides polyol premixes that have an unexpectedly and significantly improved resistance to frothing and comprise:
(a) one or more polyols, preferably polyester polyols;
(b) a blowing agent comprising at least about 50% by weight of transHFCO-1233zd or at least 20% by weight of HFO-1333mzzm(Z); and
(c) a surfactant having defrothing properties, preferably a silicone surfactant in combination with glycol ether,
wherein the amount of said de-frothing component is effective to provide the polyol premix with a de-frothing time for the polyol premix of not greater than about 30 minutes, more preferably of not greater than about 20 minutes, even more preferably not greater than about 15 minutes, and most preferably of not greater than 10 minutes, wherein said de-frothing time is measured as described in the Examples hererof.

In embodiments in which a surfactant is present, the surfactant is a silicone surfactant, preferably present in combination with glycol ether.

In embodiments in which a surfactant is present, the surfactant is a non-silicone surfactant, preferably present in combination with glycol ether.

The present invention also provides improved methods of forming polyol premixes that have an unexpectedly and significantly improved resistance to frothing and comprise in preferred embodiments:
(a) combining one or more polyols, preferably polyester polyols, and a blowing agent, said blowing agent comprising at least about 70% by weight, and more preferably at least about 80% by weight of transHFCO-1233zd, and a physical co-blowing agent having de-frothing properties selected from the group consisting of cis-1,1,1,4,4,4-hexafluoro-2-butene (HFO-1336mzzm(Z) or cis-1336mzzm), methylal, methyl formate, glycerine, trans dichloroethylene (tDCE) and mixtures of two or more of these; and
(b) forming from said combination a substantially froth-free polyol premix, wherein the amount of said co-blowing agent is effective to ensure that the time from the completion of said combining step to the formation of said substantially froth-free polyol premix is not greater than about 30 minutes, more preferably not greater than about 20 minutes, more preferably not greater than about 10 minutes, more preferably not greater than about 5 minutes, and even more preferably not greater than about 1 minute.

The present invention also provides improved methods of forming polyol premixes that have significantly improved resistance to frothing and comprise in preferred embodiments:
(a) combining one or more polyols, preferably polyester polyols, and a blowing agent, said blowing agent comprising at least about 20% by weight, and more preferably at least about 30% by weight of cis-1336mzzm, and a physical co-blowing agent having de-frothing properties comprising trans1233zd; and
(b) forming from said combination a substantially froth-free polyol premix, wherein the amount of said co-blowing agent is effective to ensure that the time from the completion of said combining step to the formation of said substantially froth-free polyol premix is not greater than about 30 minutes, more preferably not greater than about 20 minutes, more preferably not greater than about 10 minutes, more preferably not greater than about 5 minutes, and even more preferably not greater than about 1 minute.

The present invention also provides improved methods of forming polyol premixes that have significantly improved resistance to frothing and comprise in preferred embodiments:
(a) combining one or more polyester polyols, and a blowing agent comprising at least about 20% by weight of cis-1336mzzm, and a physical co-blowing agent having de-frothing properties comprising trans1233zd; and
(b) forming from said combination a substantially froth-free polyol premix, wherein the amount of said co-blowing agent is effective to ensure that the time from the completion of said combining step to the formation of said substantially froth-free polyol premix is not greater than about 30 minutes.
more preferably not greater than about 20 minutes, more preferably not greater than about 10 minutes, more preferably not greater than about 5 minutes, and even more preferably not greater than about 1 minute.

The present invention also provides improved methods of forming foam comprising in preferred embodiments:
(a) opening and/or tapping a container containing a polyol premix comprising one or more polyols, preferably including at least one polyester polyols, and a blowing agent, said blowing agent comprising at least about 70% by weight, and more preferably at least about 80% by weight of transHFCO-1233zd, and a physical co-blowing agent having defrothing properties selected from the group consisting of cis-1,1,1,4,4,4-hexafluoro-2-butene (HFO-1336mzzm(Z) or cis-1336mzzm), methylal, methyl formate, glycerine, trans dichloroethylene (tDCE) and mixtures of two or more of these, wherein said polyol premix is substantially froth-free within about 30 minutes, more preferably within about 20 minutes, more preferably within about 10 minutes, more preferably within about 5 minutes, and even more preferably within about 1 minute, after said opening and/or tapping step; and (b) forming foam from said substantially froth-free polyol premix by combining said substantially froth-free polyol premix with a thermosetting component.

The present invention also provides improved methods of forming polyol premixes that have an unexpectedly and significantly improved resistance to frothing and comprise in preferred embodiments:
(a) combining one or more polyols, preferably polyester polyols, and a blowing agent, said blowing agent comprising at least about 20% by weight, and more preferably at least about 30% by weight of cis-1336mzzm, and a physical co-blowing agent having de-frothing properties selected from the group consisting of trans1233zd, methylal, methyl formate, glycerine, trans dichloroethylene (tDCE) and mixtures of two or more of these, with trans1233zd being particularly preferred; and
(b) forming from said combination a substantially froth-free polyol premix, wherein the amount of said co-blowing agent is effective to ensure that the time from the completion of said combining step to the formation of said substantially froth-free polyol premix is not greater than about 30 minutes, more preferably not greater than about 20 minutes, more preferably not greater than about 10 minutes, more preferably not greater than about 5 minutes, and even more preferably not greater than about 1 minute.

As used herein, the term "substantially froth-free polyol premix" means a polyol premix that is determined to be substantially froth-free in accordance with the procedures described in the examples hereof.

DETAILED DESCRIPTION OF PREFERRED EMBODIMENTS

The Methods

One aspect of the present invention relates to improved methods of forming substantially froth-free polyol premix compositions, and in particular, to methods which require substantially less time to form substantially froth-free polyol premix compositions, at the time of initial formation and/or at the time of use, than was heretofore possible using blowing agents that include in significant proportion the blowing agent transHFO-1233zd or in significant proportion the blowing agent cis-1336mzzm. The methods comprise providing a mixture comprising polyol, and preferably a polyol that comprises at least 50% by weight of polyol ester, and the blowing agent, wherein both the polyol and the blowing agent composition are chosen in accordance with the teachings herein, which produce unexpectedly short times required to reach substantially froth-free conditions. Applicants have unexpectedly found that a frothing problem can arise in connection with the formation and/or use of certain polyol premixes whereby the degree of frothing upon mixing and/or upon opening and/or tapping the container holding the polyol premix can cause a highly undesirable frothing action and consequently a delay in the time to form a substantially froth-free polyol premix and potentially other disadvantages as described herein. Applicants have found that a careful selection of a co-blowing agent for use with the primary blowing agent transHFCO-1233zd can help to reduce dramatically the time to achieve a substantially froth-free condition. Applicants have also found that a careful selection of a co-blowing agent for use with the primary blowing agent cisHFO-1336mzzm can help to reduce dramatically the time to achieve a substantially froth-free condition.

The step of combining the polyol and blowing agent of the present invention, as well as the step of opening and/or tapping the container containing the polyol premix of the present invention, is advantageous since it does not require any specialized techniques and can utilize any of the heretofore known techniques for combining these two components and any optional components and/or of opening or tapping of the container. The forming step is also highly advantageous since it generally requires only placing the container that contains the combined components in a quiescent condition after the mixing step or after the opening/tapping step, that is, preferably adding no substantial additional amount of kinetic energy to the container after the combining step and/or the opening/tapping steps are completed. As mentioned above, the present invention preferably includes the careful selection of the blowing agent for use with the polyol, preferably the polyol comprising polyester polyol and even more preferably comprising at least about 40% by weight of polyester polyol based on the total of polyol, in making the polyol premix. Preferred blowing agents and polyols, and optional additional components, are described herein below.

Blowing Agents

TransHFCO-1233zd and
cis-1,1,1,4,4,4-hexafluoro-2-butene
(HFO-1336mzzm(Z))

One preferred blowing agent composition preferred for use according to the present methods, polyol premixes and foams of the present invention comprises from about 25% by weight to about 80% by weight of transHFO-1233zd and a co-blowing comprising at least HFO-1336mzzm(Z) in amount effective to ensure that the time from the completion of said combining step of the present methods and/or the opening and/or tapping step of the present methods to the formation of said substantially froth-free polyol premix is not greater than about 30 minutes, more preferably not greater than about 20 minutes, more preferably not greater than about 10 minutes. Preferably in such embodiments the HFO-1336mzzm(Z) is present in the blowing agent in an amount of not less than about 20% by weight based on the total weight of the blowing agent components. Applicants have unexpectedly found that the use of HFO-1336mzzm(Z) in amounts less than about 20% by weight are not effective to result in a substantial reduction in the de-frothing time and that unexpectedly when HFO-1336mzzm(Z) is present in amounts of from 20% to about 75%, a reduction of de-frothing time of at least about 30 relative percent can be achieved. Applicants have also unexpectedly found that the use of HFO-1336mzzm(Z) in amounts less than about 20% by weight is not effective in preferred embodiments to result in a reduction in the de-frothing time to about 30 minutes or less, and that unexpectedly when HFO-1336mzzm(Z) is present in amounts of from 20% to about 75%, a de-frothing time of about 30 minutes or less can be achieved.

In preferred embodiments, the blowing agent comprises from about 50% by weight to about 80% by weight of transHFO-1233zd and from about 20% by weight to about 50% by weight of HFO-1336mzzm(Z).

In preferred embodiments, the blowing agent comprises a physical blowing agent consisting essentially of from about 50% by weight to about 80% by weight of transHFO-1233zd and from about 20% by weight to about 50% by weight of HFO-1336mzzm(Z).

In preferred embodiments, the blowing agent comprises a physical blowing agent consisting of from about 50% by weight to about 80% by weight of transHFO-1233zd and from about 20% by weight to about 50% by weight of HFO-1336mzzm(Z).

In preferred embodiments, the blowing agent comprises from about 70% by weight to about 80% by weight of transHFO-1233zd and from about 20% by weight to about 30% by weight of HFO-1336mzzm(Z).

In preferred embodiments, the blowing agent comprises a physical blowing agent consisting essentially of from about 70% by weight to about 80% by weight of transHFO-1233zd and from about 20% by weight to about 30% by weight of HFO-1336mzzm(Z)

In preferred embodiments, the blowing agent comprises a physical blowing agent consisting of from about 70% by weight to about 80% by weight of transHFO-1233zd and from about 20% by weight to about 30% by weight of HFO-1336mzzm(Z).

Each of the blowing agents described in this section are useful according to any of the methods described herein.

Each of the blowing agents described in this section are useful for forming any of the premix compositions described herein.

Each of the blowing agents described in this section are useful for making any of foams described herein.

TransHFCO-1233zd and methylal

One preferred blowing agent composition preferred for use according to the present methods, polyol premixes and foams of the present invention comprises at least about 70% by weight of transHFO-1233zd and a co-blowing comprising at least dimethoxymethane (CH3-O—CH2-O—CH3), also known as methylal, in amount effective to ensure that the time from the completion of said combining step of the present methods and/or the opening and/or tapping step of the present methods to the formation of said substantially froth-free polyol premix is not greater than about 30 minutes, more preferably not greater than about 20 minutes, more preferably not greater than about 15 minutes. Preferably in such embodiments the methylal is present in the blowing agent in an amount of at least about 0.5% by weight based on the total weight of the blowing agent components. Applicants have found that the use of methylal in amounts less than about 0.50% by weight are not effective to result in a substantial reduction in the de-frothing time and that unexpectedly when methylal is present in amounts of from about 0.5% to about 3%, a reduction of de-frothing time of at least about 50 relative percent can be achieved. Furthermore, applicants have also unexpectedly found that while the use of methylal at amounts of from greater than 3% to about 25% has the effect of reducing defrothing time, this reduction is actually less than when the amount is from about 0.5% to about 3%, preferably about 1%. Moreover, applicants have further unexpectedly found that the greatest reduction in de-frothing time occurs with a blowing agent consisting essentially of, and preferably consisting of, about 70% by weight of transHFO-1233zd and about 30% by weight of methylal. In particular, for such preferred embodiments in which the blowing agent consists essentially of, and preferably consisting of, about 70% by weight of transHFO-1233zd and about 30% by weight of methylal, a reduction in the de-frothing time of at least about 75 relative percent, and even more preferably about 85 relative % can be achieved, and/or defrothing times of less than 20 minutes and more preferably less than about 15 minutes, can be achieved.

In preferred embodiments, the blowing agent comprises from about 70% by weight to about 99% by weight of transHFO-1233zd and from about 1% by weight to about 30% by weight of methylal.

In preferred embodiments, the blowing agent comprises a physical blowing agent consisting essentially of from about 70% by weight to about 99% by weight of transHFO-1233zd and from about 1% by weight to about 30% by weight of methylal.

In preferred embodiments, the blowing agent comprises a physical blowing agent consisting of from about 70% by weight to about 99% by weight of transHFO-1233zd and from about 1% by weight to about 30% by weight of methylal.

In preferred embodiments, the blowing agent comprises from about 97% by weight to about 99.5% by weight of transHFO-1233zd and from greater than 0.5% by weight to less than 3% of methylal.

In preferred embodiments, the blowing agent comprises a physical blowing agent consisting essentially of from about 97% by weight to about 99.5% by weight of transHFO-1233zd and from greater than 0.5% by weight to less than 3% of methylal.

In preferred embodiments, the blowing agent comprises a physical blowing agent consisting of from about 97% by weight to about 99.5% by weight of transHFO-1233zd and from greater than 0.5% by weight to less than 3% of methylal.

In preferred embodiments, the blowing agent comprises about 70% by weight of transHFO-1233zd and about 30% of methylal.

In preferred embodiments, the blowing agent comprises a physical blowing agent consisting essentially of from about 70% by weight of transHFO-1233zd and about 30% of methylal.

In preferred embodiments, the blowing agent comprises a physical blowing agent consisting of from about 70% by weight of transHFO-1233zd and about 30% of methylal.

Each of the blowing agents described in this section are useful according to any of the methods described herein.

Each of the blowing agents described in this section are useful for forming any of the premix compositions described herein.

Each of the blowing agents described in this section are useful for making any of foams described herein.

TransHFCO-1233zd and methyl formate

One preferred blowing agent composition preferred according to the present invention comprises at least about 70% by weight of transHFO-1233zd and a co-blowing comprising at least methyl formate (HCO2CH3) in amount effective to ensure that the time from the completion of said combining step to the formation of said substantially froth-free polyol premix is not greater than about 30 minutes, more preferably not greater than about 20 minutes, more preferably not greater than about 15 minutes. Preferably, in such embodiments the methyl formate is present in the blowing agent in an amount of at least about 0.5% by weight based on the total weight of the blowing agent components. Applicants have unexpectedly found that the use of methyl formate in amounts less than about 0.50% by weight are not effective to result in a substantial reduction in the de-frothing time and that unexpectedly when methyl formate is present in amounts of from about 0.5% to about 2%, a reduction of de-frothing time of at least about 50 relative percent can be achieved. Furthermore, applicants have also unexpectedly found that while the use of methyl formate in amounts of from greater than 2% to about 25% has the effect of reducing defrothing time, this reduction is actually less than when the amount is from about 0.5% to about 2%, preferably about 1%. Moreover, applicants have further unexpectedly found that the greatest reduction in de-frothing time occurs with a blowing agent consisting essentially of, and preferably consisting of, about 70% by weight of transHFO-1233zd and about 30% by weight of methyl formate. In particular, for such preferred embodiments in which the blowing agent consists essentially of, and preferably consisting of, about 70% by weight of transHFO-1233zd and about 30% by weight of methyl formate, a reduction in the de-frothing time of at least about 75 relative percent, and even more preferably about 85 relative % can be achieved, and/or defrothing times of less than 20 minutes and more preferably less than about 15 minutes, can be achieved.

In preferred embodiments, the blowing agent comprises from about 70% by weight to about 99% by weight of transHFO-1233zd and from about 1% by weight to about 30% by weight of methyl formate.

In preferred embodiments, the blowing agent comprises a physical blowing agent consisting essentially of from about 70% by weight to about 99% by weight of transHFO-1233zd and from about 1% by weight to about 30% by weight of methyl formate.

In preferred embodiments, the blowing agent comprises a physical blowing agent consisting of from about 70% by weight to about 99% by weight of transHFO-1233zd and from about 1% by weight to about 30% by weight of methyl formate.

In preferred embodiments, the blowing agent comprises from about 90% by weight to about 97% by weight of transHFO-1233zd and from greater than 3% by weight to less than 10% of methyl formate.

In preferred embodiments, the blowing agent comprises a physical blowing agent consisting essentially of from about 90% by weight to about 97% by weight of transHFO-1233zd and from greater than 3% by weight to less than 10% of methyl formate.

In preferred embodiments, the blowing agent comprises a physical blowing agent consisting of from about 90% by weight to about 97% by weight of transHFO-1233zd and from greater than 3% by weight to less than 10% of methyl formate.

In preferred embodiments, the blowing agent comprises about 70% by weight of transHFO-1233zd and about 30% of methyl formate.

In preferred embodiments, the blowing agent comprises a physical blowing agent consisting essentially of from about 70% by weight of transHFO-1233zd and about 30% of methyl formate.

In preferred embodiments, the blowing agent comprises a physical blowing agent consisting of about 70% by weight of transHFO-1233zd and about 30% of methyl formate.

In preferred embodiments, the blowing agent comprises about 99% by weight of transHFO-1233zd and about 1% of methyl formate.

In preferred embodiments, the blowing agent comprises a physical blowing agent consisting essentially of from about 99% by weight of transHFO-1233zd and about 1 of methyl formate.

In preferred embodiments, the blowing agent comprises a physical blowing agent consisting of about 99% by weight of transHFO-1233zd and about 1% of methyl formate.

Each of the blowing agents described in this section are useful according to any of the methods described herein.

Each of the blowing agents described in this section are useful for forming any of the premix compositions described herein.

Each of the blowing agents described in this section are useful for making any of foams described herein.

TransHFCO-1233zd and transdichloroethylene

One preferred blowing agent composition preferred according to the present invention comprises at least about 70% by weight of transHFO-1233zd and a co-blowing comprising at least trans-1,2-dichloroethylene (ClHC=CHCL), also referred to herein as "tDCE," in amount effective to ensure that the time from the completion of said combining step to the formation of said substantially froth-free polyol premix is not greater than about 30 minutes, more preferably not greater than about 20 minutes, more preferably not greater than about 15 minutes. Preferably, in such embodiments the tDCE is present in the blowing agent in an amount of at least about 2% by weight based on the total weight of the blowing agent components. Applicants have unexpectedly found that the use of tDCE in amounts of about 1% or less by weight are not effective to result in a substantial reduction in the de-frothing time and that unexpectedly when tDCE is present in amounts of from about 2% to about 10%, a reduction of de-frothing time of at least about 30 relative percent can be achieved. Furthermore, applicants have also unexpectedly found that while the use of tDCE in amounts of from greater than 2% to about 5% has the effect of reducing defrothing time, this reduction is further improved for blowing agent compositions in which tDCE is present in amounts of about 10%. In particular, for such preferred embodiments in which the blowing agent consists essentially of, and preferably consisting of, about 90% by weight of transHFO-1233zd and about 10% by weight of tDCE, a reduction in the de-frothing time of at least about 75 relative percent, and even more preferably about 85 relative % can be achieved, and/or defrothing times of less than 20 minutes and more preferably less than about 15 minutes, can be achieved.

In preferred embodiments, the blowing agent comprises from about 90% by weight to about 97% by weight of transHFO-1233zd and from about 3% by weight to about 10% by weight of tDCE.

In preferred embodiments, the blowing agent comprises a physical blowing agent consisting essentially of from about 90% by weight to about 97% by weight of transHFO-1233zd and from about 3% by weight to about 10% by weight of tDCE.

In preferred embodiments, the blowing agent comprises a physical blowing agent consisting of from about 90% by weight to about 97% by weight of transHFO-1233zd and from about 3% by weight to about 10% by weight of tDCE.

In preferred embodiments, the blowing agent comprises from about 90% by weight to about 95% by weight of transHFO-1233zd and from greater than 5% by weight to about 10% of tDCE.

In preferred embodiments, the blowing agent comprises a physical blowing agent consisting essentially of from about 90% by weight to about 95% by weight of transHFO-1233zd and from greater than 5% by weight to about 10% of tDCE.

In preferred embodiments, the blowing agent comprises a physical blowing agent consisting of from about 90% by weight to about 95% by weight of transHFO-1233zd and from greater than 5% by weight to about 10% of tDCE.

In preferred embodiments, the blowing agent comprises about 90% by weight of transHFO-1233zd and about 10% of tDCE.

In preferred embodiments, the blowing agent comprises a physical blowing agent consisting essentially of from about 90% by weight of transHFO-1233zd and about 10% of tDCE.

In preferred embodiments, the blowing agent comprises a physical blowing agent consisting of about 90% by weight of transHFO-1233zd and about 10% of tDCE.

Each of the blowing agents described in this section are useful according to any of the methods described herein.

Each of the blowing agents described in this section are useful for forming any of the premix compositions described herein.

Each of the blowing agents described in this section are useful for making any of foams described herein.

One preferred blowing agent composition preferred for use according to the present methods, polyol premixes and foams of the present invention comprises from about 25% by weight to about 80% by weight of HFO-1336mzzm(Z) and a co-blowing comprising transHFO-1233zd in amount effective to ensure that the time from the completion of said combining step of the present methods and/or the opening and/or tapping step of the present methods to the formation of said substantially froth-free polyol premix is not greater than about 40 minutes, more preferably not greater than about 30 minutes, more preferably not greater than about 20 minutes. Preferably in such embodiments the trans1233zd is present in the blowing agent in an amount of not less than about 25% by weight and not more than about 75% by weight based on the total weight of the blowing agent components. Applicants have unexpectedly found that the use of trans1233zd in amounts less than about 25% by weight and in amounts greater than amount 80% by weight are not effective to result in a substantial reduction in the de-frothing time and that unexpectedly when trans1233zd is present in amounts of from 25% to about 80%, a reduction of de-frothing time of at least about 20 relative percent, more preferably at least about 30 relative percent can be achieved. Applicants have also unexpectedly found that the use of trans1233zd in amounts less than about 25% by weight is not effective in preferred embodiments to result in a reduction in the de-frothing time to about 30 minutes or less, and that unexpectedly when HFO-1336mzzm(Z) is present in amounts of from 25% to about 80%, a substantial and unexpected reduction in de-frothing time can be achieved, preferably to a time of about 30 minutes or less.

In preferred embodiments, the blowing agent comprises from about 20% by weight to about 75% by weight of HFO-1336mzzm(Z) and from about 25% by weight to about 80% by weight of transHFO-1233zd.

In preferred embodiments, the blowing agent comprises a physical blowing agent consisting essentially of from about 20% by weight to about 75% by weight of HFO-1336mzzm(Z) and from about 25% by weight to about 80% by weight of transHFO-1233zd In preferred embodiments, the blowing agent comprises a physical blowing agent consisting of from about 20% by weight to about 75% by weight of HFO-1336mzzm(Z) and from about 25% by weight to about 80% by weight of transHFO-1233zd.

In preferred embodiments, the blowing agent comprises from about 20% by weight to about 30% by weight of HFO-1336mzzm(Z) and from about 70% by weight to about 80% by weight of transHFO-1233zd.

In preferred embodiments, the blowing agent comprises a physical blowing agent consisting essentially of from about 20% by weight to about 30% by weight of HFO-1336mzzm(Z) and from about 70% by weight to about 80% by weight of transHFO-1233zd.

In preferred embodiments, the blowing agent comprises a physical blowing agent consisting of from about 20% by weight to about 30% by weight of HFO-1336mzzm(Z) and from about 70% by weight to about 80% by weight of transHFO-1233zd.

Each of the blowing agents described in this section are useful according to any of the methods described herein.)

Each of the blowing agents described in this section are useful for forming any of the premix compositions described herein.

Each of the blowing agents described in this section are useful for making any of foams described herein.

Preferred Amounts of Blowing Agent in the Polyol Premix

In connection with amount of the blowing agent of the present invention (trans1233zd and defrothing co-blowing agent or cis1336mzzm and its defrothing co-blowing agent) used in the polyol premix compositions of the present invention, it is contemplated that this amount can vary widely and achieve the advantageous properties described herein for the methods, foams and polyol premixes. In preferred embodiments, the blowing agent can be present in the polyol premix, based on the total weight of the components in the premix composition, in an amount of about 2 wt % to about 40 wt %, or about 2 wt % to about 30 wt %, or about 5 wt % to about 30 wt %, or about 10 wt % to about 30 wt %, or about 2 wt % to about 25 wt %, or about 5 wt % to about 25 wt %, or about 10 wt % to about 25 wt %.

Those skilled in the art, based on the teachings contained herein, will be able to select the amount of blowing agent to be used for the type of foam being made. For example, flexible foam preferably uses a relatively low concentration of blowing agent according to any embodiment of the blowing agent as disclosed herein, preferably in an amount of from about 0.25 wt % to about 10 wt %, or 0.5 wt % to about 8 wt %, or about 0.5 wt % to about 6 wt %, or about 0.5 wt % to about 5 wt %, or about 0.5 wt % to about 4 wt %. Spray foam preferably includes a blowing agent according to any embodiment of the blowing agent as disclosed herein, and preferably in an amount of from about 4 wt % to about 25 wt %, or about 4 wt % to about 20 wt %, or about 4 wt % to about 15 wt %, or about 6 wt % to about 12 wt %. Appliance foam, PIR panel foam, and PUR panel foam preferably include a blowing agent according to any embodiment of the blowing agent as disclosed herein and preferably in an amount of from about 5 wt % to about 30 wt %, or about 10 wt % to about 30 wt %, or about 15 wt % to about 30 wt %.

The Polyols

In connection with polyol premix compositions, the polyol can be present in the polyol premix in widely ranging amounts, depending on the type of foam to be formed and other factors well known to those skilled in the art. In general, it is preferred that the polyol component(s) of the polyol premix are present in an amount of about 50 wt % to about 98 wt %, based on the total weight of the components in the polyol premix composition. In preferred embodiments, the amount of polyol in the polyol premix composition, based on the total weight of the components in the premix composition, is from about 55 wt % to about 98 wt % of the polyol premix composition, or about 60 wt % to about 98 wt %, or about 65 wt % to about 98 wt %, or about 70 wt % to about 98 wt %, or about 75 wt % to about 98 wt %, or about 80 wt % to about 98 wt %, or about 85 wt % to about 98 wt %, or about 90 wt % to about 98 wt %, or about 50 wt % to about 95 wt %, or about 50 wt % to about 90 wt %, or about 50 wt % to about 85 wt %, or about 60 wt % to about 95 wt %, or about 60 wt % to about 90 wt %, or about 60 wt % to about 85 wt %, or about 60 wt % to about 80 wt %, or about 65 wt % to about 95 wt %, or about 65 wt % to about 90 wt %, or about 65 wt % to about 85 wt %, or about 65 wt % to about 80 wt %.

In connection with polyol premix compositions, it is preferred that the polyol component comprises at least about 40% by weight of polyester polyol based on the total polyol present, more preferably at least about 50% by weight of polyester polyol based on the total polyol present, and even more preferably at least about 60% of polyester polyol based on the total polyol present.

The polyester polyol may comprise one or more polyester polyols. A wide variety of polyester polyols can be used. Suitable polyester polyols include, but are not limited to, aromatic polyester polyols, aromatic polyethylene terephthalate polyols, aromatic carboxylic anhydrides, linear poly(diethylene adipate) glycol based polyester polyols, dipropylene glycol, and combinations thereof.

In addition to the polyester polyol(s), there can be one or more additional polyols. The additional polyol can be any polyol which reacts in a known fashion with an isocyanate in preparing a polyurethane or polyisocyanurate foam. Useful additional polyols comprise one or more of: a sucrose containing polyol; a phenol formaldehyde containing polyol; a glucose containing polyol; a sorbitol containing polyol; a methylglucoside containing polyol; toluene diamine containing polyol; Mannich base polyol; glycerol containing polyol; ethylene glycol containing polyol; diethylene glycol containing polyol; propylene glycol containing polyol; graft copolymers of polyether polyols with a vinyl polymer; a copolymer of a polyether polyol with a polyurea; one or more of (a) condensed with one or more of (b):
(a) glycerine, ethylene glycol, diethylene glycol, trimethylolpropane, ethylene diamine, pentaerythritol, soy oil, lecithin, tall oil, palm oil, castor oil;
(b) ethylene oxide, propylene oxide, butylene oxide, a mixture of ethylene oxide and propylene oxide; or combinations thereof.

A preferred premix formulation to be used to make foam for appliances, PIR panels, and PUR panels comprises from about 65 wt % to about 85 wt % of polyester polyol and optional additional polyol based on total polyol premix composition (about 20 wt % to about 99 wt % polyester polyol and about 1 wt % to about 80 wt % additional polyol (if present) (based on total weight of polyol)). The polyol premix composition may contain about 15 wt % to about 30 wt % of any and each of the blowing agents of the present invention as described herein (based on total polyol premix). In such premix formulations, there may preferably be about 0.2 to about 5 wt % of a surfactant and about 0.1 wt % to about 6 wt % of a catalyst. The polyol premix in such applications composition may preferably contain optionally about 15 wt % of flame retardant, and about 10 wt % of other additives.

A preferred poyol premix for use in spray foam application comprises about 65 wt % to about 85 wt % of polyester polyol and optional additional polyol based on total polyol premix composition (about 40 wt % to about 99 wt % polyester polyol and about 1 wt % to about 60 wt % additional polyol (if present) (based on total weight of polyol)). The polyol premix composition preferably in such embodiments contains about 6 wt % to about 12 wt % of any and each of the blowing agents of the present invention as described herein (based on total polyol premix). In such formulations there preferably can be about 0.2 to about 5 wt % of a surfactant and about 0.1 wt % to about 8 wt % of a catalyst. The polyol premix composition may optionally contain in preferred embodiments 15 wt % of flame retardant, and 10 wt % of other additives.

Other Components

An auxiliary blowing agent can be present. Suitable auxiliary blowing agents include, but are not limited to, other hydrohaloolefins, fluorocarbons, chlorocarbons, chlorofluorocarbons, hydrocarbons, ethers, esters, aldehydes, ketones, acetals, organic acids, atmospheric gases, gas generating materials, or combinations thereof. By gas generating materials, we mean chemical blowing agents (as opposed to physical blowing agents) that generates gas, for example $CO_2$, through decomposition or chemical reaction in connection with/as part of the foaming reaction. Examples of gas generating materials (chemical blowing agents) include, but are not limited to, water, formic acid, or azodicarbonamide. Water reacts with the isocyanate to form carbon dioxide. Formic acid reacts with isocyanate to form carbon dioxide and carbon monoxide.

The polyol premix composition may contain a surfactant. The surfactant is used to form a foam from the mixture, as well as to control the size of the bubbles (cells) of the foam so that a foam of a desired cell structure is obtained. Preferably, a foam with small bubbles or cells therein of uniform size is desired since it has the most desirable physical properties such as compressive strength and thermal conductivity. Also, the foam should have stable cells which do not collapse prior to forming or during foam rise.

Suitable surfactants include silicone surfactants and non-silicone surfactants. The surfactant component is preferably present in the polyol premix composition in an amount of about 0.1 wt % to about 10 wt %, or about 0.2 wt % to about 5 wt %, or about 0.2 wt % to about 3.0 wt %, or about 0.5 wt % to about 3.0 wt % by weight of the polyol premix composition.

The polyol premix composition contains a catalyst. Suitable catalysts include amine catalysts and non-amine catalysts. The catalyst is preferably present in the polyol premix composition in an amount of about 0.2 wt % to about 8.0 wt %, or about 0.4 wt % to about 7.0 wt %, or about 0.5 wt % to about 6.0 wt %, by weight of the polyol premix composition.

Conventional flame retardants can optionally be incorporated, preferably in an amount of not more than about 20 wt % of the polyol premix, or not more than about 15 wt %, or not more than about 10 wt %. Some embodiments, such as appliance foam, typically do not contain any flame retardant. Optional flame retardants include, but are not limited to, tris(2-chloroethyl)phosphate, tris(2-chloropropyl)phosphate, tris(2,3-dibromopropyl)phosphate, tris(,3-dichloropropyl)phosphate, tri(2-chloroisopropyl)phosphate, tricresyl phosphate, tri(2,2-dichloroisopropyl)phosphate, diethyl N,N-bis(2-hydroxyethyl) aminomethylphosphonate, dimethyl methylphosphonate, tri(2,3-dibromopropyl)phosphate, tri(1,3-dichloropropyl)phosphate, and tetra-cis-(2-chloroethyl)ethylene diphosphate, triethylphosphate, diammonium phosphate, various halogenated aromatic compounds, antimony oxide, aluminum trihydrate, polyvinyl chloride, melamine, and the like.

In addition to the previously described ingredients, other ingredients such as, dyes, fillers, pigments, dispersing agents, cell stabilizers, nucleating agents (such as 3M's perfluoro compounds, PF-5056 and FA-188), and the like can be included in the preparation of the foams. The other ingredients will typically be included in an amount up to a total of 20 wt % of the polyol premix composition, or not more than 15 wt %, or not more than 10 wt %, or not more than 5 wt %. Conventional fillers for use herein include, for example, aluminum silicate, calcium silicate, magnesium silicate, calcium carbonate, barium sulfate, calcium sulfate, glass fibers, carbon black and silica. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

In general, it is contemplated that the order and manner of the addition of the components to form the polyol premix can vary widely within the scope of the present invention. The blowing agent can be added to one or more of the polyol components or visa versa, and this can occur before or after the other remaining components of the premix composition are added. Alternatively, all of the components could be added at the same time.

The amount and composition of the polyol used to form the foamable composition and the foam depends in part on the type of foam being made and can be determined by those skilled in the art without undo experimentation in view of the teachings contained herein. Flexible foam can preferably contain, for example, from about 80 wt % to about 95 wt % of total polyol (polyester polyol and additional polyol (if any)) by weight of the polyol premix composition. In a spray foam, there can preferably be, for example, about 65 wt % to about 85 wt % of total polyol by weight of the polyol premix composition. For appliance foam, there can preferably be, for example, be about 65 wt % to about 85 wt % of total polyol by weight of the polyol premix composition. For polyurethane (PUR) panel foam, there can preferably be, for example, be about 65 wt % to about 80 wt % of total polyol by weight of the polyol premix composition. For polyisocyanurate (PIR) panel foam, there can preferably be, for example, be about 65 wt % to about 85 wt % of total polyol by weight of the polyol premix composition. The PIR panel foam can, for example, be substantially all polyester polyol.

A preferred premix formulation to be used to make foam for appliances, PIR panels, and PUR panels comprises from about 65 wt % to about 85 wt % of polyester polyol and optional additional polyol based on total polyol premix composition (about 20 wt % to about 99 wt % polyester polyol and about 1 wt % to about 80 wt % additional polyol (if present) (based on total weight of polyol)). The polyol premix composition may contain about 15 wt % to about 30 wt % of any and each of the blowing agents of the present invention as described herein (based on total polyol premix). In such premix formulations, there may preferably be about 0.2 to about 5 wt % of a surfactant and about 0.1 wt % to about 6 wt % of a catalyst. The polyol premix in such applications composition may preferably contain optionally about 15 wt % of flame retardant, and about 10 wt % of other additives.

A preferred poyol premix for use in spray foam application comprises about 65 wt % to about 85 wt % of polyester polyol and optional additional polyol based on total polyol premix composition (about 40 wt % to about 99 wt % polyester polyol and about 1 wt % to about 60 wt % additional polyol (if present) (based on total weight of polyol)). The polyol premix composition preferably in such embodiments contains about 6 wt % to about 12 wt % of any and each of the blowing agents of the present invention as described herein (based on total polyol premix). In such formulations there preferably can be about 0.2 to about 5 wt % of a surfactant and about 0.1 wt % to about 8 wt % of a catalyst. The polyol premix composition may optionally contain in preferred embodiments 15 wt % of flame retardant, and 10 wt % of other additives.

A preferred poyol premix for use in flexible foam comprises from about 80 wt % to about 95 wt % of polyester polyol and optional additional polyol based on total polyol premix composition (about 10 wt % to about 99 wt % polyester polyol and about 1 wt % to about 90 wt % additional polyol (if present) (based on total weight of polyol)). The polyol premix composition may contain about 0.5 wt % to about 4 wt % of any and each of the blowing agents of the present invention as described herein. There can be about 0.2 to about 5 wt % of a surfactant, and about 0.1 wt % to about 3.5 wt % of a catalyst. The polyol premix composition may contain optionally about 10 wt % of flame retardant, and about 10 wt % of other additives.

Foamable Compositions

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868, 224; 3,401,190; 3,454,606; 3,277,138; 3,492,330; 3,001, 973; 3,394,164; 3,124.605; and 3,201,372. Preferred as a class are the aromatic polyisocyanates.

Representative organic polyisocyanates correspond to the formula:

wherein R is an aliphatic group, an aromatic group, or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5-'tetraisocyanate, and the like; arylalkyl polyisocyanates such as xylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene diisocyanate, polymethylene polyphenyl isocyanate, 2,4- and 2,6-toluenediisocyanate, dianisidine diisocyanate, bitoylene isocyanate, 1,4-diisocyanate, bis(4-isocyanatophenyl)methene, bis(2-methyl-4-isocyanatophenyl)methane, and the like. Preferred polyisocyanates are the polymethylene polyphenyl isocyanates, particularly the mixtures containing about 30 to about 85 percent by weight of methylenebis(phenyl isocyanate) with the remainder of the mixture comprising the polymethylene polyphenyl polyisocyanates of functionality higher than 2. In certain cases, a so-called isocyanate prepolymer can also be used. The prepolymer is formed by combining an excess of diisocyanate with polyol (polyester polyol, or polyether polyol). These polyisocyanates are prepared by conventional methods known in the art. In the present invention, the polyisocyanate and the polyol are employed in amounts which will yield an NCO/OH stoichiometric ratio in a range of about 0.9 to about 5.0. In the present invention, the NCO/OH equivalent ratio is, preferably, about 0.9 to about 4, or about 0.95 to about 3. Suitable organic polyisocyanates include polymethylene polyphenyl isocyanate, methylene bis(phenyl isocyanate), toluene diisocyanates, or combinations thereof.

In the preparation of polyisocyanurate foams, trimerization catalysts are preferably used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and N-(2-hydroxy-5-nonylphenol) methyl-N-methylglycinate.

The polyurethane or polyisocyanurate foams produced can vary in density from about 0.5 pounds per cubic foot to about 60 pounds per cubic foot, or about 0.5 to about 20.0 pounds per cubic foot, or about 0.5 to about 15 pounds per cubic foot. The density obtained is a function of how much of the blowing agent or blowing agent mixture plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well-known applications, including but not limited to thermal insulation, cushioning, flotation, packaging, adhesives, void filling, crafts and decorative, and shock absorption.

The following examples are provided for the purpose of illustrating the present invention but without limiting the scope thereof.

Comparative Example 1: Trans1233zd in Polyester Polyol Premix

A polyol premix representative of a polyester polyol-based spray foam polyol premix formulation is formed as indicated in the Table C1A below:

TABLE C1A

| Component | Parts per 100 parts total polyol (php) |
| --- | --- |
| Polyester polyol (Terol 649) | 60 |
| Polyether polyol/mannich base (Voranol 470X) | 30 |
| Polyether polyol/mannich base (Jeffol SG360) | 10 |
| TOTAL POLYOL | 100 |
| Flame Retardant (TCPP) | 10 |
| Surfactant (DC193) | 1.5 |
| Total | 110.5 |

The polyol premix composition used according to this example did not include water or catalyst in order to ensure that any stability effects that those components might exhibit would not skew the frothing properties observed.

About 80 grams of the polyol premix in Table 1 were mixed with about 20 parts of trans1233zd in a test tube and shaken vigourously for about 20 seconds and then placed in an oven maintained at about 45 C. At the time intervals indicated in Table C1B below the tube is removed from the oven, a valve on the tube is opended to expose the test tube contents to atmospheric pressure, and the frothing behavior is observed at that time interval. The test tube is then returned to the oven until the next interval. The results of this testing are reported in Table C1B below:

TABLE C1B

| Time Since Initial Placement into 45C Oven, minutes | Frothing Results (SF—Substantial Frothing; BP—Bubbles Present; NF—No Frothing; NT—Not Tested) |
| --- | --- |
| 10 | NT |
| 15 | SF |
| 20 | NT |
| 30 | BP |
| 35 | BP |
| 40 | NF |
| 45 | NF |

The results as reported in the table above indicate a substantial and deleterious delay from the time of forming the polyol/blowing agent combination would occur when the blowing agent consists of trans1233zd. Similarly, the results as reported in the table above indicate a substantial and deleterious delay from the time of opening or tapping a container containing the polyol/blowing agent combination would occur when the blowing agent consists of trans1233zd.

Comparative Example 2: Trans1233zd/tDCE in Polyester Polyol Premix

The same polyol premix as indicated in the Table C1A above is used and is combined with a blowing agent comprising 99% by weight of trans1233zd and 1% by weight of transDiChloroEthylene (tDCE) and tested for frothing behavior using the same procedures as described in Comparative Example 1 using the same total amount of the blowing agent (20% by weight). No improvement in frothing behavior is observed, as indicated in Table CE2 below:

TABLE CE2

| Time Since Placement into 45C Oven, minutes | Frothing Results (SF—Substantial Frothing; BP—Bubbles Present; NF—No Frothing; NT—Not Tested) |
|---|---|
| 10 | SF |
| 15 | SF |
| 20 | NT |
| 30 | SF |
| 35 | SF |
| 40 | SF |
| 45 | NF |

Example 1: Trans1233zd and More than 1% tDCE by Weight in Polyester Polyol Premix The same polyol premix as indicated in the Table C1A above is used and is combined with a series of blowing agent combinations consisting of trans1233zd and tDCE but with the amount of tDCE being greater than 1% by weight based on the amount of trans1233zd and tDCE. The total amount of the blowing agent used in 20% by weight. The various proportions tested together with the frothing results are indicated in Table 1 below, with the results from Comparative Example 2 being included for convenience:

TABLE 1

| Time Since Initial Placement into 45 C. Oven, minutes | Trans1233zd/tDCE Weight Ratio |||||||
|---|---|---|---|---|---|---|
| | 99/1 | 97/3 | 95/5 | 90/10 | 80/20 | 70/30 |
| | Frothing Results (SF—Substantial Frothing; BP—Bubbles Present; NF—No Frothing; NT—Not Tested) ||||||
| 10 | SF | SF | SF | BP | NT | NT |
| 15 | NT | SF | SF | NT | NT | NT |
| 20 | SF | BP | BP | NF | NT | NT |
| 30 | SF | NF | NF | NF | NT | NT |
| 35 | NT | NT | NT | NT | NT | NT |
| 40 | NF | NF | NF | NT | NT | NT |
| 45 | NT | NT | NT | NT | NT | NT |

Based on the results reported in the Table 1 above, it is seen that while 1% by weight of tDCE does not produce a reduction in the time to defroth compared to trans1233zd alone, increasing the relative amount of tDCE to from 3% and up to about 10% produces a substantial improvement in frothing behavior (substantially froth free after 25 minutes or sooner), and that amounts of tDCE of about 10% based on the total of trans1233zd and tDCE produces a polyol premix that is substantially free of frothing after only about 20 minutes.

Example 2: Trans1233zd and Methylal in Polyester Polyol Premix

The same polyol premix as indicated in the Table C1A above is used and is combined with a series of blowing agent combinations and tested for frothing behavior using the same procedures as described in Comparative Example 1 using the same total amount of the blowing agent (20% by weight). The blowing agent, however, consists of a combination of trans1233zd and methylal in the various proportions as indicated in Table 2 below and produced the frothing results as indicated in Table 2:

TABLE 2

| Time Since Initial Placement into 45 C. Oven, minutes | Trans1233zd/Methylal Weight Ratio |||||||
|---|---|---|---|---|---|---|
| | 99/1 | 97/3 | 95/5 | 90/10 | 80/20 | 70/30 |
| | Frothing Results (SF—Substantial Frothing; BP—Bubbles Present; NF—No Frothing; NT—Not Tested) ||||||
| 10 | SF | NT | NT | BP | BP | NF |
| 15 | NT | SF | SF | NT | NT | NT |
| 20 | NF | NT | BP | BP | BP | NF |
| 30 | NF | NF | NF | NF | NT | NF |
| 35 | NT | NT | NT | NT | NT | NT |
| 40 | NF | NT | NT | NT | NT | NT |
| 45 | NT | NT | NT | NT | NT | NT |

Based on the results reported in the Table 2 above, it is seen that with as little as 1% by weight of methylal produces a substantial improvement in frothing behavior, and that amounts of methylal of from about 1% by weight to about 30% by weight based on the total of trans1233zd and methylal produce a substantial improvement in behavior, particularly polyol premix that is substantially free of frothing after about 30 minutes or sooner. Even more surprisingly, applicants have found that the presence of methylal in an amount of about 30% produces an even more dramatic improvement in defrothing behavior, namely, an absence of substantial frothing pursuant to this test after only 10 minutes, whereas amounts of about 20% by weight and less have substantial frothing or bubbles produced.

Comparative Example 3: Trans1233zd/cis1336mmz in Polyester Polyol Premix

The same polyol premix as indicated in the Table C1A above was combined with a blowing agent consisting of various amounts by weight of trans1233zd and cis1336mmz and tested for frothing behavior using the same procedures as described in Comparative Example 1 using the same total amount of the blowing agent (20% by weight). No improvement in frothing behavior is observed for amounts of cis1336mmz up to about 10% by weight based on the total of trans1233zd and cis1336mmz, as indicated in Table CE3 below:

TABLE CE3

| Time Since Placement into 45C Oven, minutes | Trans1233zd/Cis1336mmz Weight Ratio ||||
|---|---|---|---|---|
| | 99/1 | 97/3 | 95/5 | 90/10 |
| | Frothing Results (SF—Substantial Frothing; BP—Bubbles Present; NF—No Frothing; NT—Not Tested) ||||
| 10 | SF | SF | NT | NT |
| 15 | NT | NT | SF | SF |
| 20 | SF | NT | NT | NT |
| 30 | BP | NT | BP | BP |
| 35 | NT | NT | NT | NT |
| 40 | NF | NT | NT | NT |
| 45 | NT | NT | NF | NF |

As can be seen from the test result reported above, no improvement in frothing behavior compared to trans1233zd alone is observed for cis1336mzz weight percents up to 10%.

Example 3: Trans1233zd and More than 10% cis1336mmz in Polyester Polyol Premix The same polyol premix as indicated in the Table C1A above is used and is combined with a series of blowing agent combinations consisting of trans1233zd and tDCE but with the amount of tDCE being greater than 1% by weight based on the amount of trans1233zd and tDCE. The total amount of the blowing agent used in 20% by weight. The various proportions tested together with the frothing results are indicated in Table 3 below, with the results 90/10 results from Comparative Example 3 being included for convenience:

TABLE 3

| Time Since | Trans1233zd/tDCE Weight Ratio | | | | | |
|---|---|---|---|---|---|---|
| Initial Placement into 45 C. Oven, minutes | 90/10 | 80/20 | 70/30 | 50/50 | 25/75 | 0/100 |
| | Frothing Results (SF—Substantial Frothing; BP—Bubbles Present; NF—No Frothing; NT—Not Tested) | | | | | |
| 10 | NT | SF | SF | SF | SF | SF |
| 15 | SF | SF | SF | SF | NT | NT |
| 20 | NT | BP | BP | BP | SF | BP |
| 30 | BP | NF | NF | NF | NF | BP |
| 35 | NT | NT | NT | NT | NT | NT |
| 40 | NT | NF | NF | NF | NF | NF |
| 45 | NF | NT | NT | NT | NT | NT |

Based on the results reported in the Table 3 above, it is seen that while amounts of cis1336mmz up to 10% by weight do not produce a reduction in the time to defroth compared to trans1233zd alone, but surprisingly increasing the relative amount of cis1336mmz to from about 20% and up to about 75% of cis1336mmz produces a substantial improvement in frothing behavior (substantially froth free after 30 minutes).

Example 4: Trans1233zd and Methyl Formate in Polyester Polyol Premix

The same polyol premix as indicated in the Table C1A above is used and is combined with a series of blowing agent combinations and tested for frothing behavior using the same procedures as described in Comparative Example 1 using the same total amount of the blowing agent (20% by weight). The blowing agent, however, consists of a combination of trans1233zd and methyl formate in the various proportions as indicated in Table 4 below and produced the frothing results as indicated in Table 4:

TABLE 4

| Time Since | Trans1233zd/Methyl formate Weight Ratio | | | | | |
|---|---|---|---|---|---|---|
| Initial Placement into 45 C. Oven, minutes | 99/1 | 97/3 | 95/5 | 90/10 | 80/20 | 70/30 |
| | Frothing Results (SF—Substantial Frothing; BP—Bubbles Present; NF—No Frothing; NT—Not Tested) | | | | | |
| 10 | SF | NT | NT | SF | SF | NF |
| 15 | NT | SF | NF | NT | NT | NT |
| 20 | NF | NT | NT | BP | BP | NF |
| 30 | NF | NF | NF | NF | NT | NF |
| 35 | NT | NT | NT | NT | NT | NT |
| 40 | NF | NT | NT | NT | NT | NT |
| 45 | NT | NT | NT | NT | NT | NT |

Example 5: Trans1233zd and Defrothing Surfactant in Polyester Polyol Premix

The same polyol premix as indicated in the Table C1A above is used and is combined with the silicone surfactant sold under the trade designation PM301 by Dabco in various amounts based on the amount of trans1233zd and PM301. The total amount of the blowing agent used in 20% by weight. The various proportions tested together with the frothing results are indicated in Table 5 below, with the results from Comparative Example 2 being included for convenience:

TABLE 5

| Time Since | Trans1233zd/PM301 Weight Ratio | | | | |
|---|---|---|---|---|---|
| Initial Placement into 45 C. Oven, minutes | 100 | 99/1 | 97/3 | 95/5 | 90/10 |
| | Frothing Results (SF—Substantial Frothing; BP—Bubbles Present; NF—No Frothing; NT—Not Tested) | | | | |
| 10 | NT | SF | SF | SF | BP |
| 15 | SF | NT | SF | SF | NT |
| 20 | NT | SF | BP | BP | NF |
| 30 | BP | BP | NF | NF | NF |
| 35 | BP | NT | NT | NT | NF |
| 40 | NF | NF | NF | NF | NT |
| 45 | NF | NT | NT | NT | NT |

Based on the results reported in the Table 1 above, it is seen that while 1% by weight of the surfactant does not produce a substantial reduction in the time to defroth compared to trans1233zd alone, and it is further seen that amounts of the surfactant up to about 5% by weight produces an improvement in frothing behavior. Surprisingly, this data shows that amounts of the defrothing surfactant greater than 5% by weight, specifically and preferably at least about 10% by weight based on the total of trans1233zd and the defrothing surfactant produces a polyol premix that is substantially free of frothing after only about 20 minutes.

Comparative Example 4: 100% cis1336mzzm in Polyester Polyol Premix

A polyol premix representative of a polyester polyol-based spray foam polyol premix formulation is formed as indicated in the Table C4A below:

TABLE C4A

| Component | Parts per 100 parts total polyol (php) |
|---|---|
| Polyester polyol (Terol 649) | 60 |
| Polyether polyol/mannich base (Voranol 470X) | 30 |
| Polyether polyol/mannich base (Jeffol SG360) | 10 |
| TOTAL POLYOL | 100 |
| Flame Retardant (TCPP) | 10 |
| Surfactant (DC193) | 1.5 |
| Total | 110.5 |

The polyol premix composition used according to this example did not include water or catalyst in order to ensure that any stability effects that those components might exhibit would not skew the frothing properties observed.

About 80 grams of the polyol premix in Table 1 were mixed with about 20 parts of cis1336mzzm (and no co-blowing agents) in a test tube and shaken vigourously for about 20 seconds and then placed in an oven maintained at about 45 C. At the time intervals indicated in Table C1B below the tube is removed from the oven, a valve on the tube is opended to expose the test tube contents to atmospheric pressure, and the frothing behavior is observed at that time interval. The test tube is then returned to the oven until the next interval. The results of this testing are reported in Table C4B below:

TABLE C4B

| Time Since Initial Placement into 45C Oven, minutes | Frothing Results (SF—Substantial Frothing; BP—Bubbles Present; NF—No Frothing; NT—Not Tested) |
|---|---|
| 10 | SF |
| 15 | NT |
| 20 | BP |
| 30 | BP |
| 35 | NT |
| 40 | NF |
| 45 | Ny |

The results as reported in the table above indicate a substantial and deleterious delay from the time of forming the polyol/blowing agent combination would occur when the blowing agent consists of cis1336mzzm. Similarly, the results as reported in the table above indicate a substantial and deleterious delay from the time of opening or tapping a container containing the polyol/blowing agent combination would occur when the blowing agent consists of cis1336mzzm.

Comparative Example 5: Cis1336mmz/trans1233zd in Polyester Polyol Premix

The same polyol premix as indicated in the Table C4A above was combined with a blowing agent consisting of various amounts by weight of trans1233zd and cis1336mmz and tested for frothing behavior using the same procedures as described in Comparative Example 4 using the same total amount of the blowing agent (20% by weight). No improvement in frothing behavior is observed for amounts of trans1233zd in amount of from about 90% up to about 99% by weight based on the total of trans1233zd and cis1336mmz, as indicated in Table C5A below:

TABLE C5A

| Time Since Placement into 45C Oven, minutes | Trans1233zd/Cis1336mmz Weight Ratio Frothing Results (SF—Substantial Frothing; BP—Bubbles Present; NF—No Frothing; NT—Not Tested) | | | |
|---|---|---|---|---|
| | 99/1 | 97/3 | 95/5 | 90/10 |
| 10 | SF | SF | NT | NT |
| 15 | NT | NT | SF | SF |
| 20 | SF | NT | NT | NT |
| 30 | BP | NT | BP | BP |
| 35 | NT | NT | NT | NT |
| 40 | NF | NT | NT | NT |
| 45 | NT | NT | NF | NF |

As can be seen from the test result reported above, no improvement in frothing behavior compared to cis1336mzz alone is observed when amounts of from 90% to 99% by weight of trans1233zd are added as a co-blowing agent.

Example 6: 20% to about 75% cis1336mmz and from about 25% to about 80% trans1233zd in Polyester Polyol Premix The same polyol premix as indicated in the Table C4A above is used and is combined with a series of blowing agent combinations consisting of cis1336mzzm and trans1233zd with the amount of trans1233zd being from about 25% to about 80% based on the amount of cis1336mzzm and trans1233zd. The total amount of the blowing agent used is 20% by weight as with the comparative examples. The various proportions tested together with the frothing results are indicated in Table 6 below, with the results from the 100% cis1336mzzm from Comparative Example 4 and the 99% trans1233zd from Comparative Example 5 being included for convenience:

TABLE 6

| Time Since Initial Placement into 45 C. Oven, minutes | Cis1336mzzm/Trans1233zd Weight Ratio Frothing Results (SF—Substantial Frothing; BP—Bubbles Present; NF—No Frothing; NT—Not Tested) | | | | | |
|---|---|---|---|---|---|---|
| | 100/0 | 75/25 | 50/50 | 30/70 | 20/80 | 1/99 |
| 10 | SF | SF | SF | SF | SF | SF |
| 15 | NT | NT | NT | SF | SF | NT |
| 20 | BP | SF | SF | BP | BP | SF |
| 30 | BP | NF | NF | NF | NF | BP |
| 35 | NT | NT | NT | NT | NT | NT |
| 40 | NF | NF | NF | NF | NF | NF |
| 45 | NT | NT | NT | NT | NT | NT |

Based on the results reported in the Table 6 above, it is seen that while amounts of trans1233zd less than about 25% by weight do not produce a reduction in the time to defroth compared to cis1336mmz alone, but surprisingly increasing the relative amount of trans1233zd to about 25% and up to about 80% produces a substantial improvement in frothing behavior (substantially froth free after 30 minutes).

What is claimed is:

1. A polyol premix having improved resistance to frothing comprising:
    (a) one or more polyester polyols; and
    (b) a blowing agent comprising from greater than about 80% to about 97% by weight based on the total weight of blowing agent of trans 1-chloro-3,3,3-trifluoropropene (transHFCO-1233zd) and from about 3% to less than about 20% by weight based on the total weight of blowing agent of at least one of cis-1,1,1,4,4,4-hexafluoro-2-butene (HFO-1336mzzm(Z) or cis-1336mzzm), methyl formate, and combinations of these, wherein the de-frothing time of said polyol premix is at least about 30% less than the defrothing time of said polyol premix except having a blowing agent consisting of transHFCO-1233zd.

2. The polyol premix of claim 1 wherein said polyol in said polyol premix consists essentially of polyester polyol.

3. The polyol premix of claim 1 wherein said polyol in said polyol premix comprises at least about 50% by weight of polyester polyol.

4. The polyol premix of claim 1 wherein said polyol in said polyol premix comprises at least about 70% by weight of polyester polyol.

5. The polyol premix of claim 1 wherein said polyol in said polyol premix comprises at least about 80% by weight of polyester polyol.

6. The polyol premix of claim 1 wherein said polyol in said polyol premix comprises at least about 90% by weight of polyester polyol.

7. The polyol premix of claim 1 wherein the de-frothing time of said polyol premix is at least about 50% less than the defrothing time of said polyol premix except having a blowing agent consisting of transHFCO-1233zd.

8. The polyol premix of claim 1 wherein the de-frothing time of said polyol premix is at least about 80% less than the defrothing time of said polyol premix except having a blowing agent consisting of transHFCO-1233zd.

9. The polyol premix of claim 1 wherein said blowing agent further comprises cis-1,1,1,4,4,4-hexafluoro-2-butene.

10. The polyol premix of claim 1 wherein said blowing agent further comprises methyl formate.

11. The polyol premix of claim 1 wherein said blowing agent further comprises cis-1,1,1,4,4,4-hexafluoro-2-butene and methyl formate.

12. The polyol premix of claim 1 wherein said blowing agent consists essentially of transHFCO-1233zd, cis-1,1,1,4,4,4-hexafluoro-2-butene and methyl formate.

13. The polyol premix of claim 1 wherein said blowing agent consists essentially of transHFCO-1233zd and cis-1,1,1,4,4,4-hexafluoro-2-butene.

14. The polyol premix of claim 1 wherein said blowing agent consists essentially of transHFCO-1233zd and methyl formate.

15. The polyol premix of claim 1 further comprising a surfactant.

16. The polyol premix of claim 15 wherein said surfactant comprises a silicone surfactant.

17. The polyol premix of claim 16 wherein said surfactant further comprises a glycol ether.

18. The polyol premix of claim 1 wherein the de-frothing time of said polyol premix is not greater than about 40 minutes.

19. The polyol premix of claim 1 wherein the de-frothing time of said polyol premix is not greater than about 30 minutes.

20. The polyol premix of claim 1 wherein the de-frothing time of said polyol premix is not greater than about 20 minutes.

\* \* \* \* \*